(12) United States Patent
Loo et al.

(10) Patent No.: US 7,988,453 B2
(45) Date of Patent: Aug. 2, 2011

(54) VEHICLE CHARGE INLET STRUCTURE

(75) Inventors: Weng Leong Loo, Chiryu (JP); Yutaka Fujiwara, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/959,098

(22) Filed: Dec. 2, 2010

(65) Prior Publication Data

US 2011/0151693 A1 Jun. 23, 2011

(30) Foreign Application Priority Data

Dec. 18, 2009 (JP) ................................. 2009-288128

(51) Int. Cl.
*H01R 12/00* (2006.01)
(52) U.S. Cl. .......................................... 439/34; 439/142
(58) Field of Classification Search ..................... 439/34, 439/142; 180/65.27
See application file for complete search history.

(56) References Cited

U.S. PATENT DOCUMENTS

| | | | |
|---|---|---|---|
| 5,545,046 A | | 8/1996 | Masuda et al. |
| 7,438,589 B1 * | | 10/2008 | Fleury et al. ................. 439/490 |
| 7,439,851 B2 * | | 10/2008 | Fleury et al. .................. 340/438 |
| 7,597,560 B2 * | | 10/2009 | Korich et al. ..................... 439/34 |
| 7,794,280 B1 * | | 9/2010 | Markyvech .............. 439/620.29 |
| 2009/0178867 A1 | | 7/2009 | Nagata et al. |
| 2010/0102628 A1 | | 4/2010 | Soma et al. |

FOREIGN PATENT DOCUMENTS

| | | |
|---|---|---|
| DE | 32 09 007 C1 | 8/1983 |
| EP | 1 449 702 A2 | 8/2004 |
| EP | 2 039 560 A1 | 3/2009 |
| JP | 2009-77557 A | 4/2009 |
| JP | 4293250 B2 | 7/2009 |

* cited by examiner

*Primary Examiner* — Hien Vu
(74) *Attorney, Agent, or Firm* — Birch, Stewart, Kolasch & Birch, LLP

(57) ABSTRACT

A vehicle charge inlet structure includes a first socket; a second socket; an electric power storage charged with power supplied from a first charge facility through the first charge connector or from a second charge facility through the second charge connector; a panel opening formed in a panel member defining a vehicle surface of the vehicle; and a box-shaped accommodating member positioned correspondingly to a position of the panel opening, wherein the accommodating member comprises a first wall portion and a second wall portion, and the first wall portion extends in parallel with the vehicle surface and is provided with the first socket while the second wall portion extends diagonally toward the vehicle surface from an end of the first wall portion and is provided with the second socket.

8 Claims, 6 Drawing Sheets

VEHICLE CHARGE INLET STRUCTURE

CROSS REFERENCE TO RELATED APPLICATION

This application is based on and hereby claims priority to Japanese Application No. 2009-288128 filed on Dec. 18, 2009 in Japan, the contents of which are hereby incorporated by reference.

BACKGROUND OF THE INVENTION

1) Field of the Invention

The present invention relates to a vehicle charge inlet structure which is suitably used for an automobile.

2) Description of the Related Art

In recent years, development efforts have been intensified for electric vehicles which travel by the motor torque generated by an electric motor and hybrid electric vehicles which travel by a combination of the motor torque from an electric motor and the engine torque generated by an internal combustion engine. Such electric vehicles and hybrid electric vehicles each include an electric power storage, such as a battery or capacitor, and the power stored in the electric power storage is used for driving the electric motor. The battery mounted in the electric vehicle is charged with power supplied from a charge facility external to the vehicle.

Furthermore, hybrid electric vehicles are generally designed to drive the electric generator with the internal combustion engine, and the power generated by the electric generator is used to charge the battery. Similarly to electric vehicles, there are other types of vehicles whose battery can be charged with power supplied from a charge facility external to the vehicle (such vehicles are sometimes called "plug-in hybrid automobiles").

For example, Japanese Patent No. 4293250 (hereinafter, referred to as "Soma") discloses an hybrid vehicle (100) having a high-voltage charging and power-feeding unit (210) and a low-voltage charging and power-feeding unit (90), as shown in FIGS. 1 and 2 of Soma.

Note that electric vehicles equipped with an electric motor without an internal combustion engine are sometimes referred to as "battery electric vehicles (BEVs)." Herein, they are simply referred to as "electric vehicles."

In the disclosure of Soma, the high-voltage charging and power-feeding unit (210) is provided on a rear bumper (304) while the low-voltage charging and power-feeding unit (90) is provided on a front face (310), as shown in FIGS. 1 and 2 in Soma.

Furthermore, the high-voltage charging and power-feeding unit (210) is provided with a lid member (210A), and the low-voltage charging and power-feeding unit (90) is also provided with a lid member (90A).

Such a construction of Soma may be user-unfriendly. More specifically, a user of the hybrid vehicle (100) has to consider how the vehicle has to be parked, i.e., which of the high-voltage charging and power-feeding unit (210) or the low-voltage charging and power-feeding unit (90) should be positioned closer to a charge facility.

In other words, when the charge facility is a dedicated charge facility, such as a charging station, which supplies power at a relatively higher voltage (higher-voltage power), the hybrid vehicle (100) has to be parked within a range where a higher-voltage power-feeding cable extending from the charging station can be connected to the high-voltage charging and power-feeding unit (210).

In contrast, when the charge facility is a power outlet in a general facility, such as a house or store, which supplies power at a relatively lower voltage (lower-voltage power), the hybrid vehicle (100) has to be parked within a range where a lower-voltage power-feeding cable to be connected to the power outlet can be connected to the low-voltage charging and power-feeding unit (90).

However, the high-voltage charging and power-feeding unit (210) provided on the front face (310) and the low-voltage charging and power-feeding unit (90) provided on the rear bumper (304) are located distant from each other. Thus, there may be cases in which the higher-voltage power-feeding cable can be connected to the low-voltage charging and power-feeding unit (90) while the cable cannot be connected to the high-voltage charging and power-feeding unit (210), depending on where the hybrid vehicle (100) is parked. Similarly, there may be other situations where the lower-voltage power-feeding cable can be connected to the high-voltage charging and power-feeding unit (210) while it cannot be connected to the low-voltage charging and power-feeding unit (90).

In these cases, the user has to change the position of the hybrid vehicle (100), which is quite user-unfriendly.

Furthermore, the disclosure of Soma requires multiple lid members (210A and 90A), which results in an increase in the parts count.

Furthermore, provision of the multiple lid members (210A and 90A) conspicuously on the vehicle may spoil the design of the vehicle.

SUMMARY OF THE INVENTION

Against such background, the present invention is directed to provide a vehicle charge inlet structure that can improve user-friendliness during charge, and helps to reduce the parts counts and the cost while improving the design of the vehicle.

Thus, an aspect of the present invention provides a vehicle charge inlet structure including a first socket (33) configured to receive a first charge connector (36) provided at a first charge facility;

a second socket (34) configured to receive a second charge connector (38) provided at a second charge facility;

an electric power storage (15) which is configured to be charged with power supplied from the first charge facility through the first charge connector (36) or from the second charge facility through the second charge connector (38);

a panel opening (19) formed in a panel member (18, 48), the panel member (18, 48) defining a vehicle surface of the vehicle (10); and a box-shaped accommodating member (21) which is positioned correspondingly to a position of the panel opening (19) toward an interior of the vehicle (10) with respect to the panel member (18, 48), wherein the accommodating member (21) comprises a first wall portion (22) and a second wall portion (23), and the first wall portion (22) extends in parallel with the vehicle surface and is provided with the first socket (22) while the second wall portion (23) extends diagonally toward the vehicle surface from one of ends of the first wall portion (22) and is provided with the second socket (34).

The vehicle charge inlet structure of the present invention can improve user-friendliness during charge, and helps to reduce the parts counts and the cost while improving the design of the vehicle.

DESCRIPTION OF THE PREFERRED EMBODIMENTS

Hereinafter, a vehicle charge inlet structure in accordance with one embodiment of the present invention will be described with reference to the drawings.

Figure 1:
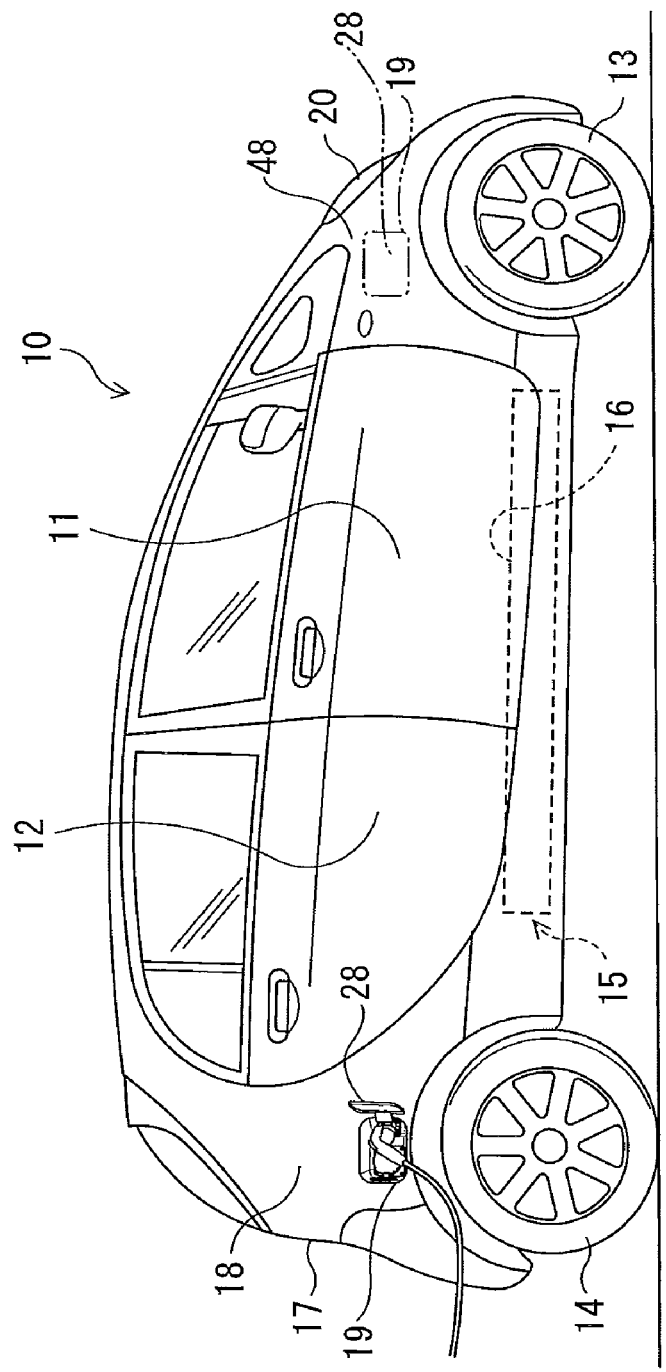
FIG. 1 is a schematic side view of a vehicle provided with a vehicle charge inlet structure in accordance with one embodiment of the present invention.

As shown in FIG. 1, an electric vehicle (vehicle) 10 is provided with front doors 11 and rear doors 12 on the sides of the vehicle 10.

Furthermore, a battery unit (battery, electric power storage) 15 is mounted under the floor panel (not shown) of the cabin of the electric vehicle 10, between front wheels 13 and rear wheels 14.

Furthermore, a rear gate 17 is provided at the rear of the electric vehicle 10, and a motor unit, an inverter, an in-vehicle charger, and a DC-DC converter, which are not shown, are mounted under a floor panel (not shown) of the trunk which is opened or closed by the rear gate 17.

A battery unit (battery) 15 includes multiple battery modules (not shown) connected in series and are enclosed within a battery case 16, and is adapted to provide power at a higher voltage (e.g., about 300 V).

The motor unit is a unit accommodating a permanent magnet electric motor (not shown) driven by the power supplied from the battery unit 15, and is mechanically coupled to the rear wheels 14. The motor unit is also capable of operating as an electric generator when a rotor (not shown) in the motor unit is operated by torque supplied from the rear wheels. In this case, the motor unit generates electric power, which is supplied to the battery unit 15 by way of the inverter, which will be described later. In other words, when the motor unit operates as an electric generator, the rear wheels 14 are prevented from being rotated. More specifically, the rear wheels 14 are braked. Such braking of the rear wheels 14 by the motor unit operating as an electric generator is referred to as a "regeneration brake". Additionally, the power generated by the motor unit during regeneration brake is referred to as "regenerated power." Furthermore, the action of charging the battery unit 15 with such regenerated power is referred to as "regenerative charge".

The inverter is electrically connected between the battery unit 15 and the motor unit, and is adapted to convert direct current output from the battery unit 15 into three-phase alternating current. The electric vehicle is also provided with an accelerator pedal that is operable by a driver (not shown). The inverter is configured to adjust the voltage or current to be supplied to the motor unit, in accordance with the amount of the pedal operation on the accelerator pedal.

The inverter is also adapted to convert the three-phase alternating current supplied from the motor unit into direct current and to supply the converted current to the battery unit 15 during regenerative charging.

The in-vehicle charger is an AC-DC converter that is electrically connected between a home charge socket (which will be described later) and the battery unit 15. In other words, the in-vehicle charger is adapted to convert alternating current supplied from a charge facility external to the vehicle via the home charge socket into single-phase direct current, and to supply the converted current to the battery unit 15, thereby charging the battery unit 15.

The DC-DC converter is adapted to convert the direct current at a higher voltage output from the battery unit 15 into direct current at a lower voltage (e.g., about 12 V). Note that the DC-DC converter is provided within the in-vehicle charger. The lower-voltage direct current converted by the DC-DC converter is supplied to various electric components, such as headlights 20, an interior light (not shown), and car audio equipment (not shown).

As shown in FIG. 1, front side panels (panel members) 48 and rear side panels (panel members) 18 are provided at the sides of the electric vehicle 10. The front side panels 48 define vehicle surface between the front of the vehicle body and the front doors 11. The vehicle surface between the rear doors 12 and the rear gate 17 is defined by the rear side panels 18.

Figure 2:
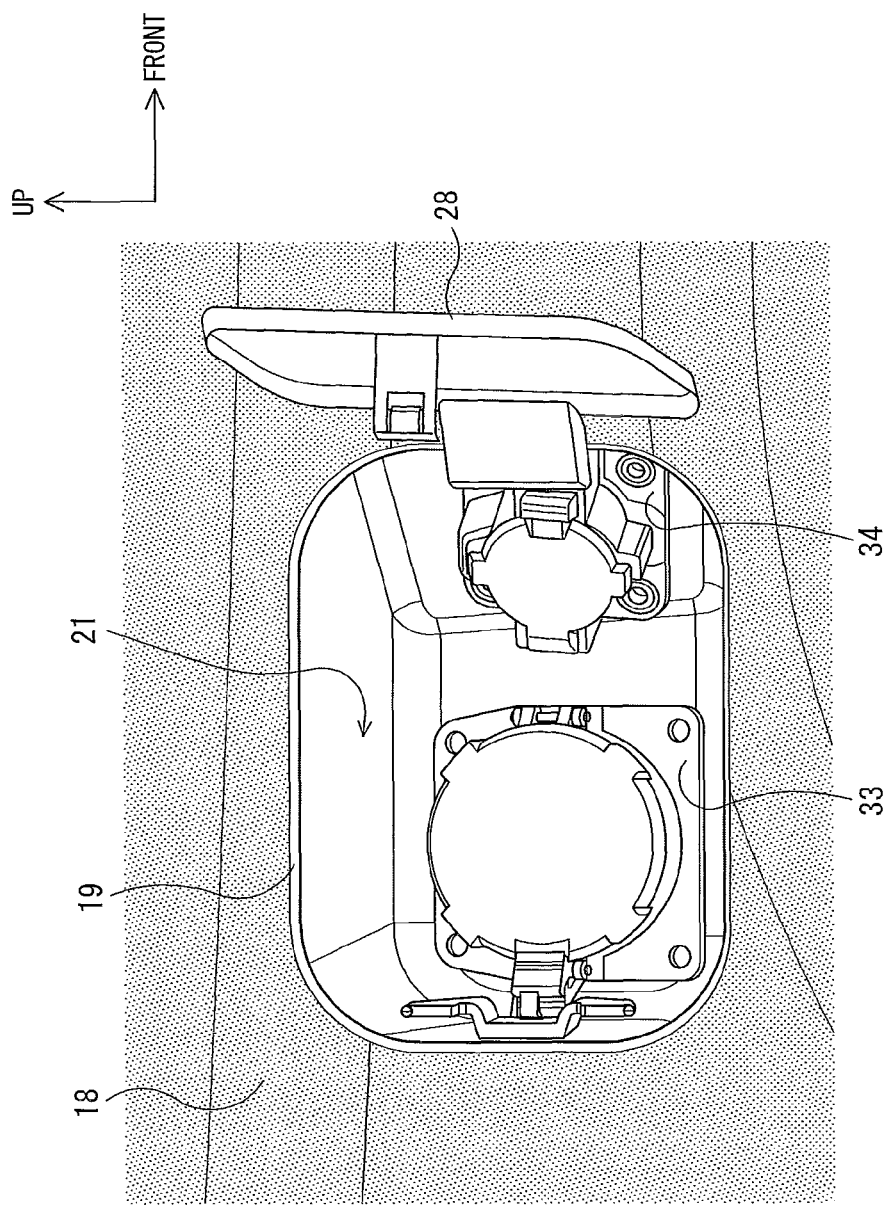
FIG. 2 is a schematic front view illustrating a vehicle charge inlet structure in accordance with one embodiment of the present invention.

As shown in FIG. 2, an accommodating box (accommodating member) 21 is embedded in one rear side panel 18 toward the interior of the vehicle. In this rear side panel 18, a panel opening 19 is also formed, and the panel opening 19 provides an access to the inside of the accommodating box 21 from outside of the vehicle.

Figure 3:
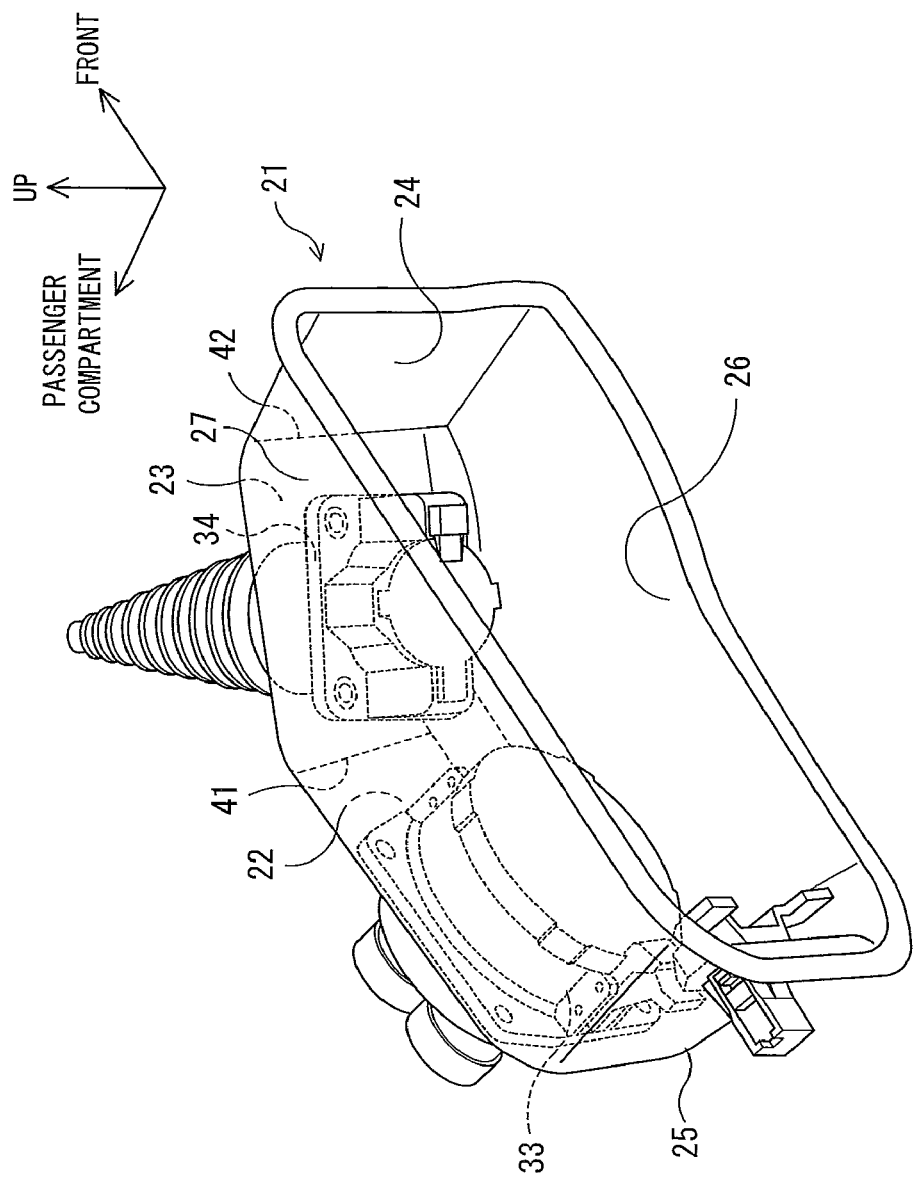
FIG. 3 is a schematic perspective view illustrating an accommodating box of a vehicle charge inlet structure in detail in accordance with one embodiment of the present invention.

As shown in FIG. 3, the accommodating box 21 is a box-shaped component having a first wall portion 22, a second wall portion 23, a third wall portion 24, a fourth wall portion 25, a fifth wall portion 26, and a sixth wall portion 27.

Figure 4:
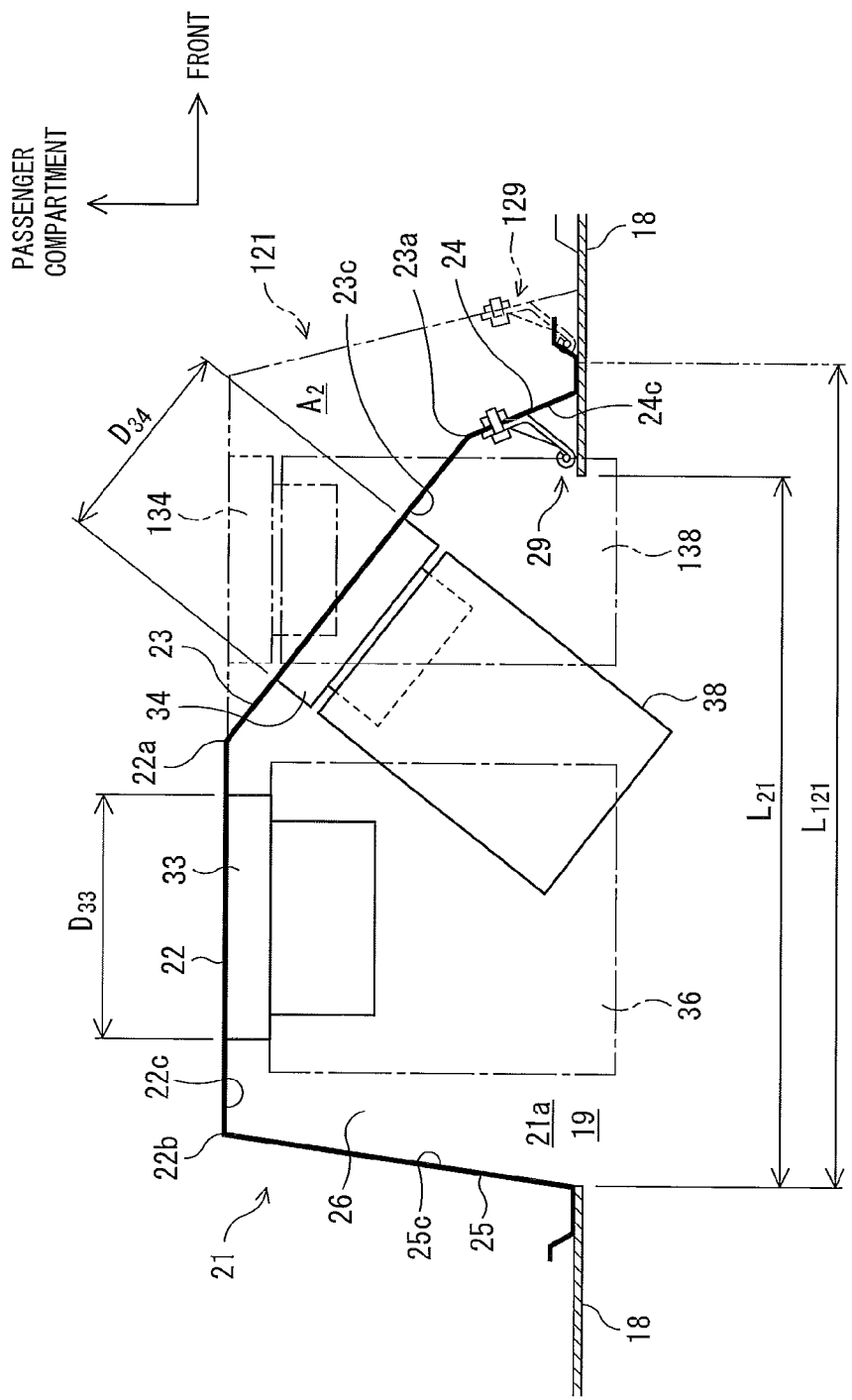
FIG. 4 is a schematic diagram illustrating a vehicle charge inlet structure when viewed from the top, in accordance with one embodiment of the present invention.

Of these wall sections, the first wall portion 22 is a wall portion extending in the vehicle length direction, and stands upright in the vehicle height direction, as shown in FIG. 3. Note that the rear side panel 18 extends in the vehicle length direction in the vicinity of the panel opening 19, as shown in FIG. 4. Accordingly, the first wall portion 22 can be regarded as extending in parallel with the rear side panel 18. Note that the term "parallel" means "generally parallel," allowing a certain level of deviation, rather than strictly parallel.

The second wall portion 23 is a wall portion that extends diagonally (i.e., extends defining an obtuse angle with respect to the first wall portion 22) toward the rear side panel 18 from a front end 22a of the first wall portion 22 when viewed from the top, as shown in FIG. 4, and stands upright in the vehicle height direction, as shown in FIG. 3. Here, the joint portion between the first wall portion 22 and the second wall portion 23 is referred to as a first joint portion 41. More specifically, the first wall portion 22 is a surface inclined with respect to the second wall portion 23, and the joint between the first wall portion 22 and the second wall portion 23 is the first joint portion 41. Furthermore, in this embodiment, the first joint portion 41 extends in a general vertical direction, as shown in FIG. 4.

The third wall portion 24 is a wall portion that extends diagonally toward the rear side panel 18 from a front end 23a of the second wall portion 23 when viewed from the top, as shown in FIG. 4, and stands upright in the vehicle height direction, as shown in FIG. 3. Here, the joint portion between the second wall portion 23 and the third wall portion 24 is referred to as a second joint portion 42.

The fourth wall portion 25 is a wall portion that extends diagonally toward the rear side panel 18 from a rear end 22b of the first wall portion 22 when viewed from the top, as shown in FIG. 4, and stands upright in the vehicle height direction, as shown in FIG. 3.

The fifth wall portion 26 is a wall portion that is connected to lower ends 22c-25c of the first wall portion 22, the second wall portion 23, the third wall portion 24, and the fourth wall portion 25, and extends generally horizontally, defining the bottom of the accommodating box 21, as shown in FIGS. 3 and 4.

The sixth wall portion 27 is a wall portion that is connected to upper ends (no reference symbols are given) of the first wall portion 22, the second wall portion 23, the third wall portion 24, and the fourth wall portion 25, and extends generally horizontally, defining the top of the accommodating box 21, as shown in FIGS. 3 and 4.

Note that the front portion of the accommodating box 21, which communicates with the panel opening 19, defines an opening (box opening) 21a, to which no wall portion is provided. Accordingly, the panel opening 19 and the box opening 21a provide an access to the inside of the accommodating box 21 from the outside of the vehicle. In other words, the accommodating box 21 is positioned correspondingly to the position of the panel opening 19 formed in the rear side panel 18. Furthermore, the box opening 21a of the accommodating box 21 is sized and positioned correspondingly to the size and the position of the panel opening 19.

Figure 6:
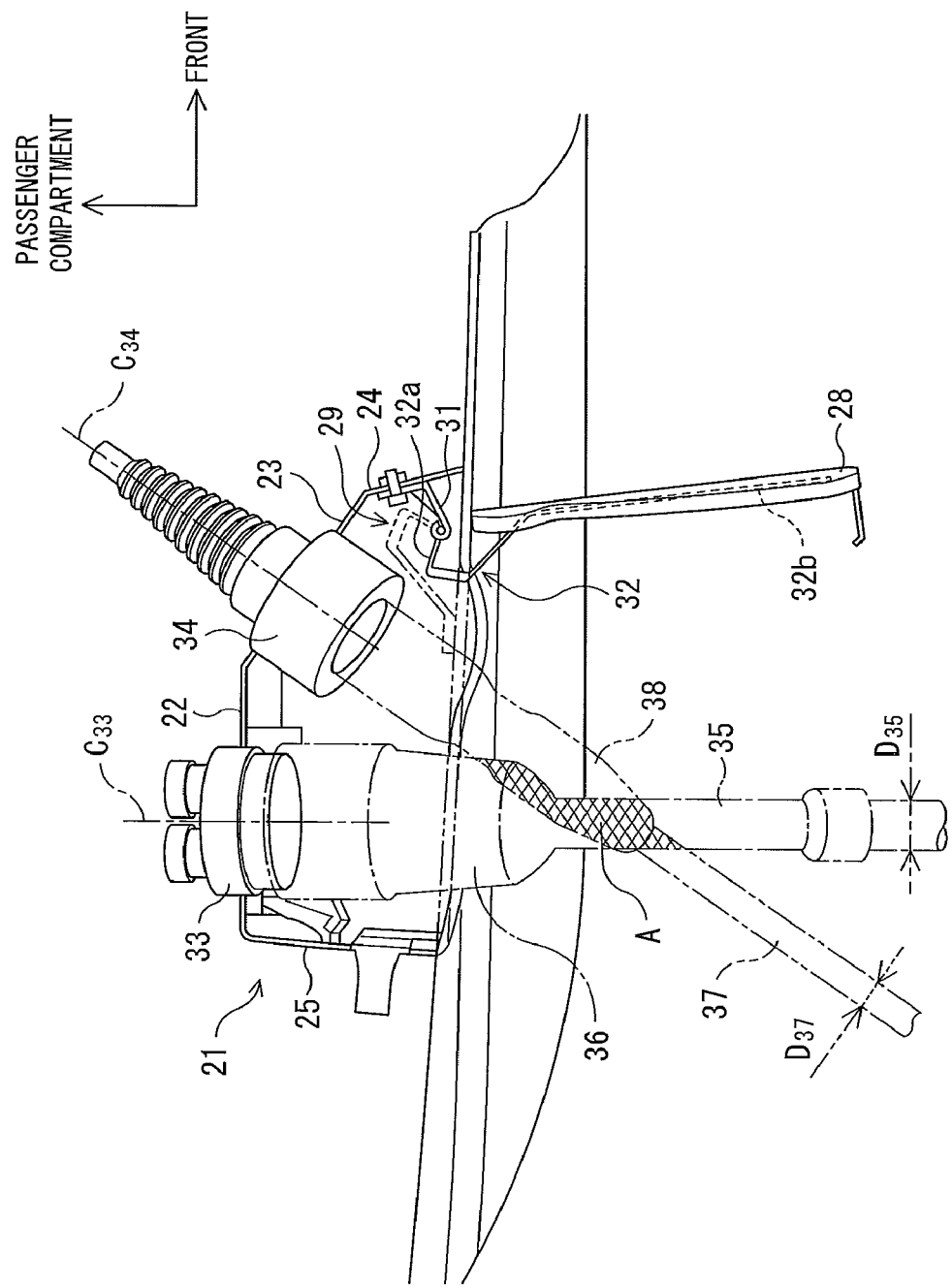
FIG. 6 is a schematic top view illustrating a vehicle charge inlet structure in accordance with one embodiment of the present invention.

As shown in FIG. 6, the box opening 21a and the panel opening 19 are opened or closed by a lid member 28.

Furthermore, the lid member 28 is supported by the hinge mechanism 29.

The hinge mechanism 29 includes a base portion 31 secured to the third wall portion 24, and an arm member 32 rotatably coupling the base portion 31 to the lid member 28.

Furthermore, a first end 32a of the arm member 32 is rotatably coupled to the base portion 31 while a second end 32b is secured to the back side of the lid member 28. Furthermore, the arm member 32 is adapted to be accommodated within the accommodating box 21 when the lid member 28 is closed (closed state), whereas the arm member 32 is adapted to protrude outwardly from the accommodating box 21 when the lid member 28 is opened (open state).

As shown in FIG. 3, on the first wall portion 22, a rapid charge socket (first socket) 33 is provided. On the second wall portion 23, a home charge socket (second socket) 34 is provided. The rapid charge socket 33 and the home charge socket 34 are arranged adjacent to each other in an array in the horizontal direction. Furthermore, the levels of the rapid charge socket 33 and the home charge socket 34 in the vertical direction (i.e., levels with respect to the vehicle height) generally coincide.

Figure 5:
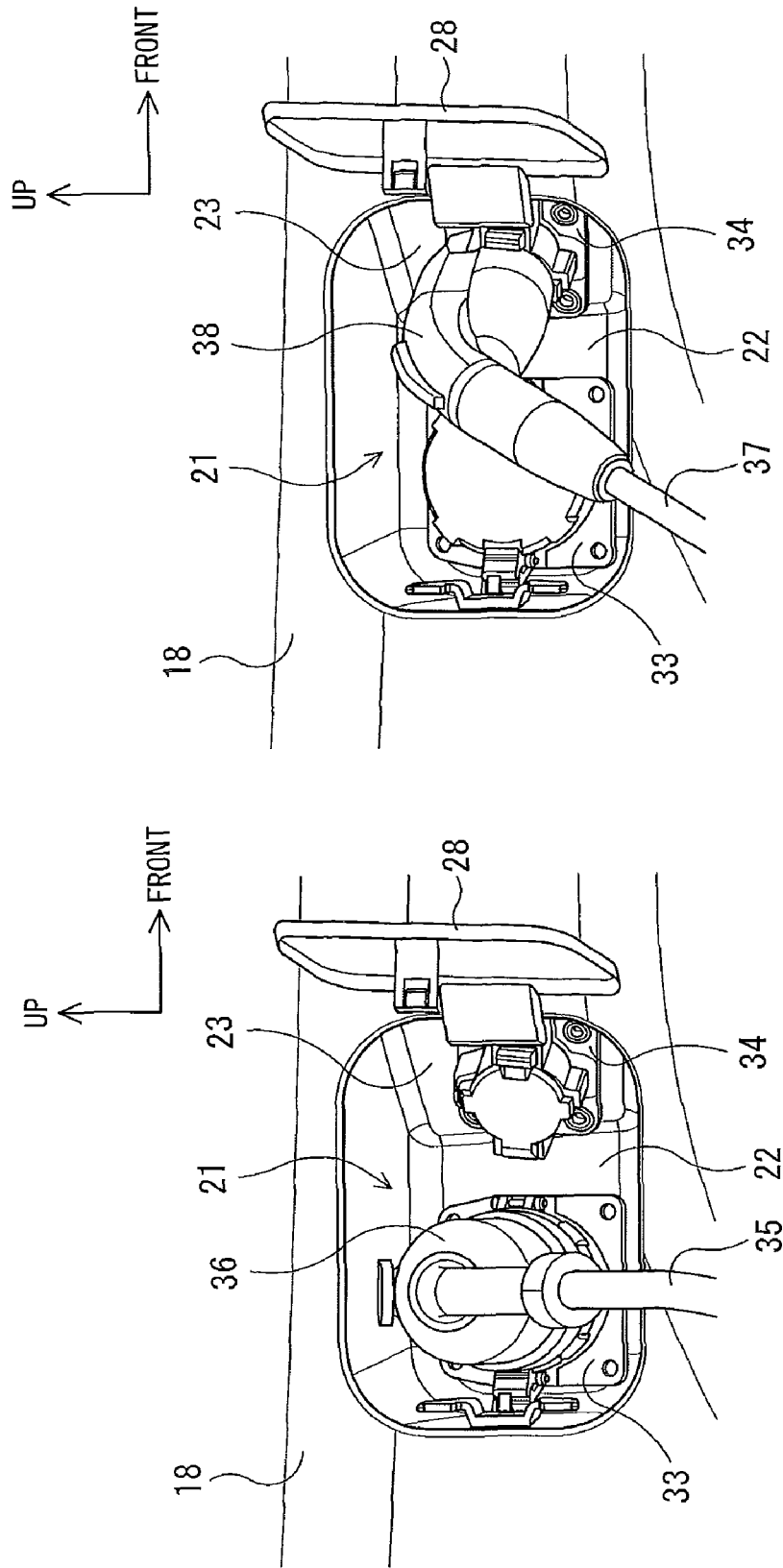
FIG. 5A is a schematic front view illustrating a vehicle charge inlet structure to which a rapid charge connector is connected, in accordance with one embodiment of the present invention.
FIG. 5B is a schematic front view illustrating a vehicle charge inlet structure to which a home charge socket is connected, in accordance with one embodiment of the present invention.

As shown in FIG. 5A, the rapid charge socket 33 is an electric socket, which detachably receives a rapid charge connector (first charge connector) 36 at a first end of a higher-voltage power cable 35 extending from a charge facility (first charge facility, not shown). The orientation of attachment or detachment of the rapid charge connector 36 to or from the rapid charge socket 33 is the orientation along the axis $C_{33}$ of the rapid charge socket 33, as shown in FIG. 6. The rapid charge socket 33 is secured on the first wall portion 22 such that the axis $C_{33}$ extends perpendicular to the first wall portion 22.

Note that examples of charge facilities provided with the rapid charge connector 36 for supplying power to the higher-voltage power cable 35 include, but not limited to, dedicated charge facilities, such as charging stations provided with dedicated vehicle chargers (not shown) or parking lots capable of charging. Dedicated vehicle chargers used in such dedicated charge facilities are adapted to convert relatively high three-phase alternating voltage (e.g., 200 V) into direct voltage, and supply the converted voltage to the rapid charge connector 36 through the higher-voltage power cable 35. Furthermore, as shown in FIG. 4, the rapid charge socket 33 has a diameter ($D_{33}$) that is greater than the diameter ($D_{34}$) of a general charge socket 34, which will be described later.

As shown in FIG. 5B, the home charge socket 34 is an electric socket, which detachably receives a home charge connector (second charge connector) 38 at a first end of a lower-voltage power cable 37 extending from a charge facility (second charge facility, not shown). The orientation of attachment or detachment of the home charge connector 38 to or from the home charge socket 34 is the orientation along the axis $C_{34}$ of the home charge socket 34, as shown in FIG. 6. The home charge socket 34 is secured to the second wall portion 23 such that the axis $C_{34}$ extends perpendicular to the second wall portion 23.

Note that examples of charge facilities provided with the home charge connector 38 for supplying power to the lower-voltage power cable 37 include, but not limited to, general charge facilities, such as typical houses or stores provided with general outlet plugs (not shown). Accordingly, once an outlet plug (not shown) at a second end of the lower-voltage power cable 37 is plugged into an outlet plug in a general charge facility while the home charge connector 38 at a first end of the lower-voltage power cable 37 is plugged into the home charge socket 34 in the electric vehicle 10, charging to the battery unit 15 is started by the in-vehicle charger (not shown) in the electric vehicle 10.

The vehicle charge inlet structure in accordance with one embodiment of the present invention constructed as mentioned above may have the following effects and advantages.

For charging the battery unit 15 in the electric vehicle 10 at a dedicated charge facility, such as a charging station or parking lot capable of charging, the lid member 28 is opened, followed by connecting the rapid charge connector 36 to the rapid charge socket 33, as shown in FIG. 5A. As set forth previously, the rapid charge socket 33 is provided on the first wall portion 22 of the accommodating box 21, and the first wall portion 22 extends in parallel with the rear side panel 18.

Accordingly, what a user is to do is simply plugging the rapid charge connector 36 into the rapid charge socket 33 in the direction perpendicular to the first wall portion 22 (i.e., at the right angle with respect to the panel opening 19 on the side of the electric vehicle 10), thereby connecting the rapid charge connector 36 to the rapid charge socket 33.

In contrast, for charging the battery unit 15 at a general charge facility, such as a typical house or store, the lid member 28 is opened, followed by connecting the home charge connector 38 to the home charge socket 34, as shown in FIG. 5B. As set forth previously, the home charge socket 34 is provided on the second wall portion 23 of the accommodating box 21, and the second wall portion 23 extends diagonally toward the rear side panel 18 (i.e., in the direction opposing to the direction toward the interior of the vehicle) from the front end 22a of the first wall portion 22 when viewed from the top, as described above with reference to FIG. 4.

Accordingly, what the user is to do is simply plugging the home charge connector 38 into the home charge socket 34 in the direction perpendicular to the second wall portion 23 (i.e., toward the upper front with respect to the panel opening 19 from the rear of the electric vehicle 10), thereby connecting the home charge connector 38 to the home charge socket 34.

Note that the higher-voltage power cable 35 has a diameter $D_{35}$ that is greater than the diameter $D_{37}$ of the lower-voltage power cable 37, as shown in FIG. 6. Thus, the operation of connecting the rapid charge connector 36 at the first end of the relatively thick higher-voltage power cable 35 to the rapid charge socket 33 appears to be more difficult than the corresponding operation of connecting the home charge connector 38 at the first end of the relatively thin lower-voltage power cable 37 to the home charge socket 34.

However, what the user is to do is simply plugging the rapid charge connector 36 into the rapid charge socket 33 in the direction perpendicular to the first wall portion 22 (in other words, at the right angle with respect to the panel opening 19 on the side of the electric vehicle 10), thereby connecting to the rapid charge socket 33. Thus, no issues of complicating operations arise.

Thus, in this embodiment, as shown in FIG. 6, if the user attempts to connect the home charge connector 38 to the home charge socket 34 (see the chain double-dashed lines) while the rapid charge connector 36 is connected to the rapid charge socket 33 (see the chain single-dashed lines), the rapid charge connector 36 and the home charge connector 38 interfere with each other (see symbol A in FIG. 6). Accordingly, the home charge connector 38 is hindered from being connected to the home charge socket 34 while the rapid charge connector 36 is connected to the rapid charge socket 33.

Similarly, if the user attempts to connect the rapid charge connector 36 connected to the rapid charge socket 33 (see the chain single-dashed lines) while the home charge connector 38 is connected to the home charge socket 34 (see the chain double-dashed lines), the home charge connector 38 and the rapid charge connector 36 interfere with each other (see symbol A in FIG. 6). Accordingly, the rapid charge connector 36 is hindered from being connected to the rapid charge socket 33 while the home charge connector 38 is connected to the home charge socket 34.

This can prevent both the rapid charge connector 36 and the home charge socket 34 from supplying powers simultaneously to charge the battery unit 15.

Furthermore, as shown in FIG. 4, the second wall portion 23 of the accommodating box 21 extending diagonally toward the rear side panel 18 from the front end 22a of the first wall portion 22 when viewed from the top can also help to shorten the vehicle-length width of the box opening 21a and the panel opening 19.

Here, in FIG. 4, the chain double-dashed lines illustrate a hypothetical accommodating box 121 in which the second wall portion 23 is omitted. In the hypothetical accommodating box 121, both a rapid charge connector 36 and a hypothetical home charge connector 138 are provided on the first wall portion 22.

In the hypothetical accommodating box 121, in order to establish a connection of the rapid charge connector 36 to the rapid charge socket 33 and to establish a connection of the hypothetical home charge connector 138 to the hypothetical home charge socket 134, the vehicle-length width $L_{121}$ of the box opening 21a and the panel opening 19 should be relatively long.

Furthermore, in order to establish a connection of the hypothetical home charge connector 138 to the hypothetical home charge socket 134, the hinge mechanism 129 is required to be provided at the position at which the hinge mechanism 129 does not interfere the home charge connector 138. In such a structure, extra space (see symbol $A_2$ in FIG. 4) is required for providing the hinge mechanism 129 within the hypothetical accommodating box 121.

In contrast, in the accommodating box 21 in this embodiment as shown by the solid lines in FIG. 4, the second wall portion 23 is formed so as to extend diagonally toward the rear side panel 18 from the front end 22a of the first wall portion 22 when viewed from the top. The orientation of attachment or detachment of the home charge connector 38 to or from the home charge socket 34 is the orientation along the axis $C_{34}$ of the home charge socket 34, as shown in FIG. 6. The home charge socket 34 is secured to the second wall portion 23 such that the axis $C_{34}$ extends perpendicular to the second wall portion 23.

Thereby, it is possible to shorten the vehicle-length width $L_{21}$ of the box opening 21a and the panel opening 19 in the accommodating box 21 of this embodiment, as shown by the solid lines in FIG. 4, as compared to the vehicle-length width $L_{121}$ of the box opening 21a and the panel opening 19 in the hypothetical accommodating box 121 (i.e., $L_{21}<L_{121}$).

Furthermore, dead space (see symbol $A_2$ in FIG. 4) within the hypothetical accommodating box 121 required for providing the hinge mechanism 129 can be eliminated, thereby achieving efficient utilization of the limited vehicle interior space.

Furthermore, the space taken up by the rapid charge connector 36 during higher-voltage charge and the space taken up by the home charge connector 38 during lower-voltage charge partially overlap, which can help to achieve efficient utilization of the space within the accommodating box 21. In other words, this can contribute to significant reduction in the internal space of the accommodating box 21.

Furthermore, as shown in FIG. 1, the panel opening 19 can be formed in the rear side panel 18 having a relatively smaller area. Reducing the area of the panel opening 19 can prevent the rigidity of the rear side panel 18 from being deteriorated.

Furthermore, the panel opening 19 having a relatively small vehicle-length width $L_{21}$ can shorten the vehicle-length width of the lid member 28 for opening or closing the panel opening 19. This can help to reduce the parts cost and the vehicle weight. Further still, since the requirement for the stiffness of the hinge mechanism 29 is made relaxed, the size of the hinge mechanism 29 can be reduced or the hinge mechanism 29 can be made from a material of a relatively smaller stiffness.

Furthermore, the rapid charge socket 33 and the home charge socket 34 are both accommodated within the accommodating box 21. Accordingly, when the user of the electric vehicle 10 wants to charge the battery unit 15, the user does not have to be aware of which of the rapid charge socket 33 and the home charge socket 34 is to be used, and simply parks the vehicle at a charge facility such that the lid member 28 is positioned not far from the charge facility. This improves the user-friendliness of the electric vehicle 10.

Furthermore, the electric vehicle 10 is provided with a single lid member 28, rather than multiple lid members, which can help to improve the design of the electric vehicle 10.

The rapid charge socket 33 and the home charge socket 34 are arranged in an array in the horizontal direction. Accordingly, before charging the battery unit 15, the user does not have to raise or lower the hand holding a rapid charge connector 36 or home charge connector 38, in order to plug it into the rapid charge socket 33 or the home charge socket 34, which again improves the user-friendliness.

In the embodiment described above, the rapid charge socket 33 is provided on the first wall portion 22 while the home charge socket 34 is provided on the second wall portion 23. In our efforts to narrow down to this embodiment, the present applicants have made the structure wherein the home charge socket 34 is provided on the first wall portion 22 while the rapid charge socket 33 is provided on the second wall portion 23.

Of course, such a structure can provide the most of the effects and advantages of the embodiment described above.

However, like the embodiment shown in FIG. 4, the area of the second wall portion 23 can be reduced, thereby increasing the third wall portion 24, by providing the rapid charge socket 33 on the first wall portion 22 while providing the home charge socket 34 on the second wall portion 23 located closer to the hinge mechanism 29. This can increase the freedom of location where the hinge mechanism 29 is provided with respect to the third wall portion 24, and hinges having various structures can be used as the hinge mechanism 29.

Although one embodiment of the present invention has been described, the present invention is not limited to the embodiment and can be varied without departing from the sprit of the present invention. Such variants will be described.

Although the above-mentioned embodiment has been described in the context wherein the vehicle surface is defined by the rear side panels 18, this is not limiting.

More specifically, the above embodiment has been described in the context wherein the panel opening 19 is formed in a rear side panel 18, the panel opening 19 may be formed in a front side panel 48, as indicated by the chain double-dashed line in FIG. 1.

Furthermore, although the above-mentioned embodiment has been described in the context wherein the panel opening 19 is provided in the rear side panel 18 on the right side of the electric vehicle 10, as shown in FIG. 1, this is not limiting. For example, the panel opening 19 may be formed in the rear side panel 18 on the left side of the vehicle. Alternatively, the panel opening 19 may be formed in the front side panel 48 provided in the left side of the vehicle.

Furthermore, although the above-mentioned embodiment has been illustrated in the context of the accommodating box 21 wherein the first wall portion 22 is generally parallel with the rear side panel 18, this is not limiting. Other arrangements are possible as long as the first wall portion 22 and the second wall portion 23 are disposed diagonally with each other.

Furthermore, although the above-mentioned embodiment has been illustrated in the context of an electric vehicle 10 of a body type having front doors 11, rear doors 12, and a rear gate 17 (also known as "5-door hatchback type") as shown in FIG. 1, this is not limiting. For example, the present invention can be applicable to any vehicles of other body types, such as a sedan, coupe, convertible, station wagon, truck, and bus.

Furthermore, although the above embodiment has been described in the context of an electric vehicle without any internal combustion engine (so-called "battery electric vehicle"), this is not limiting. The present invention can also be applicable to any vehicles provided with an electric power storage, such as a battery or a capacitor, which is charged from a source external to the vehicle. Thus, the present invention can be applicable to plug-in hybrid automobiles.

Furthermore, although the above embodiment has been described in the context wherein the rapid charge socket 33 and the home charge socket 34 are arranged in an array in the horizontal direction, this is not limiting. For example, the rapid charge socket and the home charge socket may be arranged in an array in the vertical direction. In this case, of course, the second wall portion may be formed so as to extend diagonally toward the vehicle surface direction from the upper or lower end of the first wall portion when viewed from the side (when viewed from the front or rear of the vehicle).

INDUSTRIAL APPLICABILITY

The present invention is applicable for manufacturing industries, such as vehicles.

The present invention is also applicable to the automobile industry or manufacturing industries of motion generation machines.

What is claimed is:

1. A vehicle charge inlet structure comprising:
    a first socket configured to receive a rapid electric power from a first charge connector provided at a first charge facility;
    a second socket configured to receive a home electric power from a second charge connector provided at a second charge facility;
    an electric power storage unit that stores electric power which is configured to be charged with power supplied from the first charge facility through the first charge connector or from the second charge facility through the second charge connector;
    a box-shaped accommodating member for accommodating the first and second sockets which is embedded in a panel member toward an interior of the vehicle defining a vehicle surface of the vehicle;
    a panel opening that is formed in the panel member and communicates with the accommodating member;
    wherein the accommodating member comprises a first wall portion and a second wall portion, and
    the first wall portion extends in parallel with the vehicle surface and is provided with the first socket while the second wall portion extends diagonally toward the vehicle surface from one of ends of the first wall portion and is provided with the second socket.

2. The vehicle charge inlet structure according to claim 1, wherein the first socket is capable of receiving a power higher than a power supplied to the second socket.

3. The vehicle charge inlet structure according to claim 1 or 2, further comprising:
    a lid member openably covering the panel opening; and
    a hinge mechanism openably supporting the lid member, wherein the accommodating member further comprises a third wall portion to which the hinge mechanism is secured,
    the third wall portion extends towards the vehicle surface from one of ends of the second wall portion, and
    the second socket is disposed between a first joint portion jointing the first wall portion and the second wall portion and a second joint portion jointing the second wall portion and the third wall portion.

4. The vehicle charge inlet structure according to claim 3, wherein the first charge socket and the second charge socket are arranged in an array in the horizontal direction.

5. The vehicle charge inlet structure according to claim 3, wherein the panel member is a rear side panel provided at a side of the vehicle and defining the vehicle surface.

6. The vehicle charge inlet structure according to claim 1 or 2, wherein the first charge socket and the second charge socket are arranged in an array in the horizontal direction.

7. The vehicle charge inlet structure according to claim 6, wherein the panel member is a rear side panel provided at a side of the vehicle and defining the vehicle surface.

8. The vehicle charge inlet structure according to claim 1 or 2, wherein the panel member is a rear side panel provided at a side of the vehicle and defining the vehicle surface.

* * * * *